United States Patent [19]

Peters et al.

[11] 3,856,677
[45] Dec. 24, 1974

[54] PROPORTIONAL CHEMICAL INJECTION SYSTEM

[75] Inventors: Beldon A. Peters, Houston; Louis P. Smith, Webster; Aubrey O. Landrum, Houston, all of Tex.

[73] Assignee: Esso Production Research Company, Houston, Tex.

[22] Filed: Dec. 18, 1972

[21] Appl. No.: 316,338

[52] U.S. Cl.................... 210/96, 210/105, 210/209
[51] Int. Cl............................................ B01d 17/04
[58] Field of Search................ 210/83, 96, 103–105, 210/59, 71, 209, 218, 220; 252/362, 363

[56] References Cited
UNITED STATES PATENTS

| | | | |
|---|---|---|---|
| 2,617,299 | 11/1952 | Ennis et al. | 210/96 X |
| 2,773,556 | 11/1956 | Meyers et al. | 210/96 X |
| 3,005,554 | 10/1961 | Kuntz | 210/96 |
| 3,163,173 | 12/1964 | Kuntz | 210/96 X |
| 3,256,902 | 6/1966 | Porter | 210/96 X |
| 3,273,576 | 9/1966 | Fluegel et al. | 210/96 X |
| 3,615,227 | 10/1971 | Rydberg et al. | 210/83 X |
| 3,693,797 | 9/1972 | Topol | 210/96 |
| 3,796,318 | 3/1974 | Underwood | 210/96 |

*Primary Examiner*—Thomas G. Wyse
*Attorney, Agent, or Firm*—John S. Schneider

[57] ABSTRACT

A system for treating an oil-water emulsion is provided which includes one or more separators and which is connected to a well or a plurality of wells. Each separator has means for discharging gas, free water, and emulsified oil; and injection means is provided which injects demulsifying agent into the separator(s) on receiving first and second signals from means connected to the means for discharging emulsified oil (emulsion). The first signal is a function of the amount of B.S. & W. in the separator discharge and the second signal is a function of (1) the total fluid discharge or (2) the amount of B.S. & W. in the total fluid discharge. The first signal operates switch means to close an electrical circuit connecting means which determines the two amounts and the second signal controls the injeciton means.

17 Claims, 4 Drawing Figures

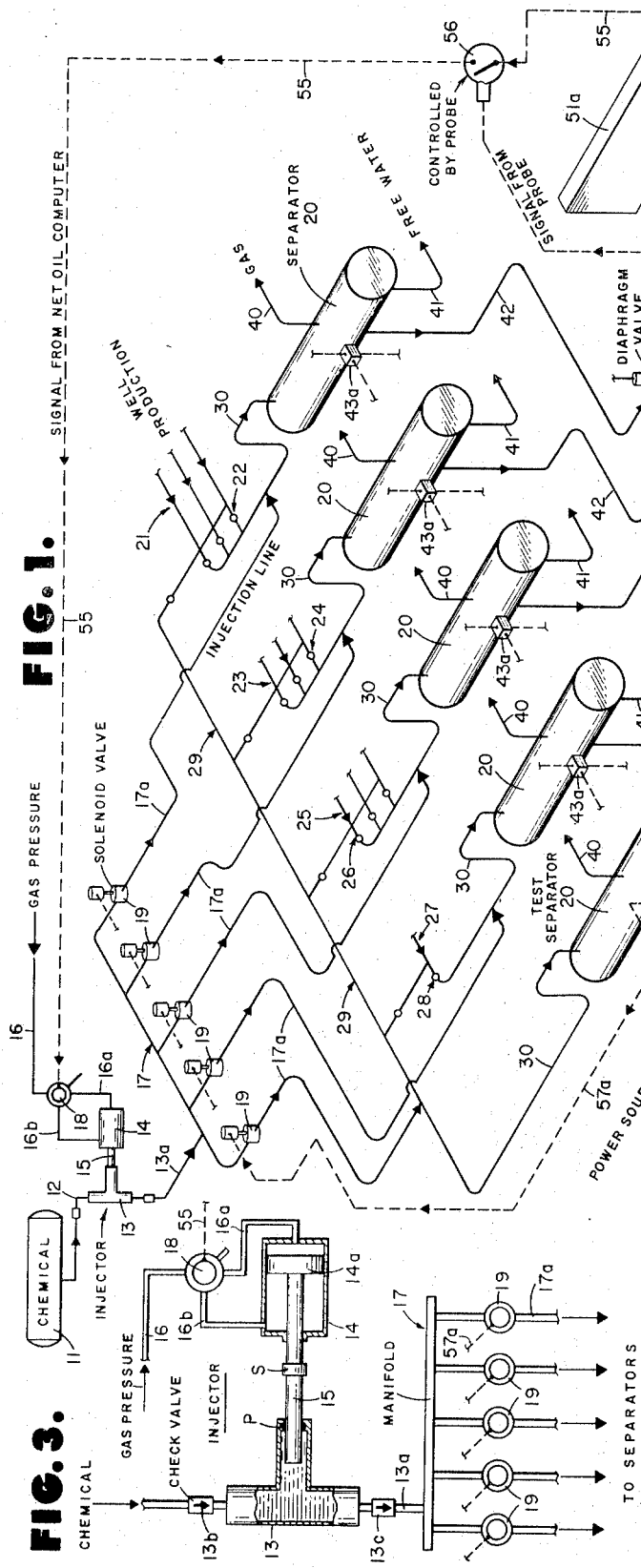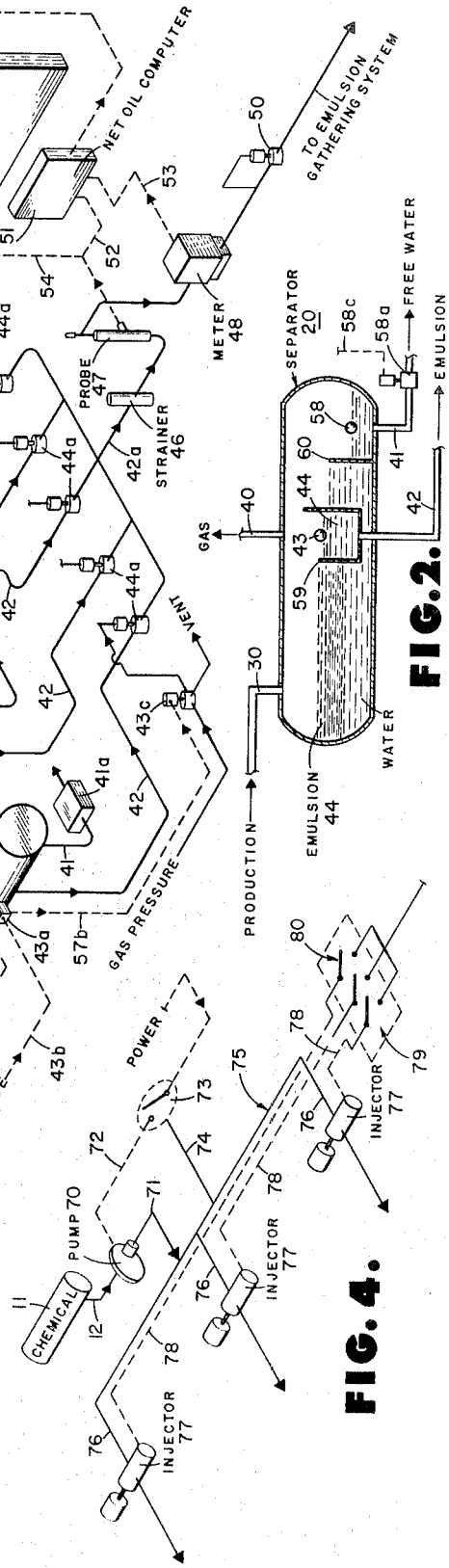

3,856,677

PROPORTIONAL CHEMICAL INJECTION SYSTEM

BACKGROUND OF THE INVENTION

1. FIELD OF THE INVENTION

The present invention is directed to a system and method for proportional chemical injection automatically. More particularly, the invention is concerned with chemical injection means and a system therefor for injecting chemicals such as demulsifiers, scale inhibitors, antifoamants, and the like. In its more specific aspects, the invention is directed to an automatic injection means and a system for using same in injecting chemicals into petroleum emulsions.

2. DESCRIPTION OF THE PRIOR ART

Chemical injection means using pumps, pressure and the like are well known. It is also known to inject chemicals into oil wells or oil lease separators. However, it has not been known or obvious heretofore to employ an automatic chemical injection system in injection of chemicals in oil separators and the like by signals obtained from means which determine amounts and/or a particular characteristic of a flowing stream.

SUMMARY OF THE INVENTION

The invention may be briefly described and summarized as a system for an emulsified mixture of oil containing water in which at least one and preferably more separators are connected to a well or a plurality of wells (say a lease) which may be termed a supply of emulsified mixture. The system is provided with a supply of chemical for injection into the separators by injection means responsive to signals from a determining means (such as a computer and associated equipment) which closes a switch means to allow transmittal of another signal which actuates the injection means and causes chemical injection in a selected amount. The invention also involves the chemical injection means and the method in which it is used in the system.

BRIEF DESCRIPTION OF THE DRAWING

The invention will be further described with reference to the drawing in which:

FIG. 1 is a schematic view of a typical time-shared metering site of the present invention;

FIG. 2 is a sectional view of a separator of FIG. 1;

FIG. 3 is a sectional view of the injection means of FIG. 1; and

FIG. 4 is a partial view of another system using a plurality of injection means being otherwise similar to FIG. 1.

Description OF THE PREFERRED MODE AND EMBODIMENTS RELATIVE TO THE DRAWING

Referring now to the drawing in which identical numerals will designate identical parts and particularly to FIG. 1, numeral 11 designates a chemical storage drum, vessel or supply which may contain a suitable liquid demulsifying agent of which many are known to the art.

Drum 11 connects by line 12 to a pump or injection means 13 actuated by actuator 14 connected thereto by means 15. Actuator 14 receives power by line or lead 16 which may be either hydraulic, pneumatic, or electric. Line 16 connects to actuator 14 by way of lines 16a and 16b through valve 18, which may be a solenoid valve which is opened by a signal received from a source which will be further described.

The pump or injector 13 has a discharge line 13a which divides to form a manifold 17 forming part thereof, each arm 17a of manifold 17 contains a valve 19, which suitably is a solenoid valve although other types of valves may be used. The manifold arms 17a each lead to a separator 20, all of which may be identical and may be one or more. In this instance but five separators are shown; however, as many as fifteen or more may be used. Ordinarily, the first or any one of a plurality of separators 20 is an individual well test separator, while the other separators 20 are suitably lease separators; that is, they serve a plurality of wells while the selected test separator 20 may be used to check a selected well in a lease comprising a plurality of wells.

The demulsifying agent flows into the separators 20 by arms (lines) 17a which connect into well flow lines 21 controlled by valves 22, flow lines 23, controlled by valves 24, flow lines 25, controlled by valves 26, and flow line 27, controlled by valve 28. All of the lines are interconnected by manifold 29 for flexibility with lines 30 thereof debouching into separators 20 as shown. It will be noted in all instances lines 17a connect into manifold 29 or lines 30 thereof.

Separators 20, as shown more clearly in FIG. 2, are each provided with a line 40 for withdrawal of gas separated in separator 20 from emulsified crude oil, line 41 for draw off of free separated water, and line 42 for discharge of an emulsion containing a controllable amount of water. Lines 40 may connect to gas measurement and gathering facilities. Likewise, test separator 20 shown as the first on the left in FIG. 1 may be provided with meter means 41a for the separated free water.

A control float 43 actuates a switch (not shown) in switch housing 43a (see FIG. 1). Electrical power is supplied to the switch by way of input lead 43b. When emulsion 44 reaches a preselected level, electrical signals from the switch, by way of leads 57a and 57b simultaneously open (1) a solenoid valve 43c, controlling the respective dump valve 44a, and (2) its corresponding solenoid valve 19 in manifold 17. Opening of solenoid valve 43c allows gas pressure to open dump valve 44a whereby emulsion 44 is discharged into line 42a through strainer 46, probe 47 and meter 48 until float 43 reaches a preselected lower level. This opens the electrical switch and the solenoid valve 19 and 43c are closed. Closing of valve 43c allows gas pressure to vent from dump valve 44a whereby it is also closed. Although not shown, each of the dump valves 44a is controlled by corresponding solenoid valve 43c and its circuitry.

The manifold being comprised of lines 42 neck down to line 42a which contains a strainer 46 for foreign matter, a capacitance probe for measuring dielectric constants, or densitometer or other fluid characteristic determining means 47, a meter 48 which may be a turbine, positive displacement, or other fluid accurate meter. A motor valve 50 is also provided to regulate back pressure on line 42a which may lead to emulsion gathering and treating facilities not shown for recovery of oil.

The probe 47 and meter 48 connect to digital computer 51 by leads 52 and 53, respectively. The probe 47 provides a first analog signal through lead 54 which is a function of the amount of water of B.S. & W. in the emulsion. A second signal from computer 51 is provided through lead 55 which is a function of the total emulsion in line 42a or the amount of water in the emulsion in line 42a.

The first signal by way of lead 54 controls switch 56. When the unseparated B.S. & W. in the emulsion is less than a manually preset percentage, switch 56 remains open. When the B.S. & W. is greater than the preset value switch 56 closes which allows the second signal in lead 55 to control valve 18 to admit power fluid to pump actuator 14 and actuate pump or injector 13 which in turn sends a preselected volume of chemical or demulsifying agent to manifold 17, valves 19 being opened by a signal received through leads 57a as previously described.

Referring again to FIG. 2, it will be seen that free water is discharged by float valve 58 actuating a solenoid valve 58a by way of lead 58c to discharge free water through line 41. Separator 20 may be provided with but is not limited to wiers 59 and 60 for separation and withdrawal, respectively, of emulsion and free water, gas being withdrawn through line 40.

In reference again to FIG. 1, the computer 51 may be replaced by a central computer 51a which is designed to control production from a field or plurality of leases but may be used also like computer 51 in addition.

In FIG. 3, a detail of FIG. 1 injection means is shown, the valve 18 being a four-way solenoid valve connected to both ends of actuator 14 which may be a double action piston 14a in piston cylinder 14 provided with lines 16a and 16b, which allows reciprocation of piston 14a and piston rod 15 provided with an adjustable stop means S and moving through a packing member into T-member of pump 13 through packing means P. The pump 13 has check valves 13b and 13c on each end thereof. The solenoid valves 19 open individually by electrical signals from the float operated valve switches in separators 20 controlling emulsion level.

Referring now to FIG. 4 chemical supply or storage 11 is connected by line 12 to a pump 70 having an outlet 71. Pump 70 receives electric or pneumatic power by line 72 containing a pressure switch 73 and receives power from a source not shown. Switch 73 is actuated or controlled by line 74 connecting to manifold 75 to which pump outlet 71 also connects. Manifold 75 has arms (lines) 76, each provided with a chemical injection means 77 which may be similar to the injection means shown in FIGS. 1 and 4, but may also be any well known chemical injection means.

The injection means 77 are operated by circuitry and means as described in FIG. 1, which comprise leads 78 which connect to a switch closure means operated by time-sharing circuitry 79 as will be described further with respect to FIG. 1 and comprises switch means 80 all controlled by a second signal as has been described with the first signal closing a switch not shown.

A more complete description of the operation of the injector means in accordance with the present invention is as follows, with reference to FIG. 1: A chemical supply is connected to the inlet side of the pump. The pump contains a ball check valve which permits chemical to be drawn into the pump when the piston rod 15 moves in one direction and to be discharged from the pump through an outlet check valve when the piston rod moves in the other direction. The chemical discharged from the pump flows into a manifold containing a plurality of normally closed solenoid valves which are connected to individual separators. Each of the solenoid valves is connected electrically to a liquid level control float mechanism in the emulsion section of its corresponding separator. The piston rod 15 is connected to a piston within a double-acting gas cylinder. Gas or hydraulic power is applied to either end of the piston through a four-way solenoid valve which is actuated by electrical signals from a net oil computer. These signals may be generated by either gross fluid volumes or B.S. & W. volumes.

When an emulsion such as one from an oil producing well or lease reaches a preset level in a given separator, an electrical switch closes, which in turn opens the dump valve and solenoid valve for that respective separator. All other solenoid valves and dump valves are prevented from opening by existing time-shared circuitry at the metering site.

When the dump valve opens the emulsion will be discharged through a capacitance probe or a densitometer and meter in the net oil computer assembly. These volume signals (1/10 barrel, 1 barrel, or 10 barrels) energize the four-way solenoid valve which moves in a position to allow the pneumatic or hydraulic power to be connected to the power end of the double-acting gas cylinder. This moves the gas cylinder piston and the pump piston forward, thereby displacing a predetermined or selected amount of chemical from the pump, through the open solenoid valve and on into the proper separator. The signals from the computer are of short duration, such that when the double-acting gas cylinder piston reaches the end of its forward stroke, the four-way solenoid valve is de-energized thereby connecting the pneumatic or hydraulic power to the return side of the piston, moving it to the original position. The four-way valve is simultaneously moved to permit the power fluid in the power end of the cylinder to be exhausted to the atmosphere or a fluid reservoir. Additional signals produced by the computer continue to cycle the pump until the float control reaches a preset lower position. When this occurs, signals are sent simultaneously to close the respective dump valve and solenoid valve. This sequence is repeated when any of the other separators receive signals from its corresponding liquid level float control.

The present invention is quite advantageous, useful and unobvious. Emulsion breaking chemicals are expensive. Hence, unecessary use thereof is to be guarded, if efficient environmentally controlled use of the country's resources is to be obtained. In addition, field personnel time to continuously adjust the quantity of chemical injected is essentially eliminated by the present invention.

In the present invention the injection means is operated by signals originated at the oil metering site. When any one separator is dumping the percentage of water in the emulsion is detected by the probe and signals corresponding to a selected volume of emulsion (usually 0.1 bbl.) are transmitted. The probe signal may be selected at 20 percent volume unseparated water but other amounts such as but not limited to 5, 10, 15 or even 30 percent may be selected. By adjusting the pump to deliver a selected amount of chemical for a selected unseparated water content, the emulsion leaving the separator may be controlled. If the amount of unseparated water is above the selected amount, more chemical (demulsifier) is used. If the amount of water in the emulsion discharge drops below the selected amount no demulsifier is added thus conserving the amount of demulsifying agent.

The chemical injection means may be used to inject other chemicals, besides demulsifiers, into wells, boilers, distillation towers and the like. Such chemicals include well known corrosion inhibitors, demulsifying agents, antifoamants and inhibitors of scale formation such as deposits of water insoluble chemicals as illustrated by "gyp" (calcium sulfate) and the like.

The nature and objects of the present invention having been completely described and illustrated and the best mode and embodiments set forth, what we wish to claim as new, useful and unobvious is:

1. A system for treating an emulsified mixture of oil and water which comprises:

at least one separator means adapted to be connected to and contain a supply of said mixture;

said separator means being provided with separate means to discharge separately gas, free water, and an emulsion of oil and water;

means connected to said separator means for injecting a selected amount of demulsifying agent into said mixture in said separator means;

means connected to said emulsion discharge means for generating and transmitting first or second signals which are, respectively, proportional to the amount of water in the emulsion or the gross amount of said emulsion discharged from said vessel when the percentage of water in said emulsion discharged from said vessel exceeds a predetermined percent;

an electrical circuit connected electrically to said generating and transmitting means and injection means; and switch means in said electrical circuit operable when the percentage of water in said emulsion exceeds said predetermined percent to close said electrical circuit means and thereby conduct said first or second signals to said injection means for injecting said selected amount of demulsifying agent.

2. A system in accordance with claim 1 in which the injection means comprises:
   a. first valve means connected to said signal generating and transmitting means and controlled by said first or second signals;
   b. pump means connected to said first valve means and to said separator means;
   c. power means connected to said pump means for operating said pump means, said power means being contolled by said first valve means; and
   d. supply means connected to said pump means for supplying said demulsifying agent to said pump means.

3. A system in accordance with claim 2 in which said pump means is provided with an outlet, said outlet being provided with a normally closed second valve means; and including a level control means arranged in said separator means and connected to said second valve means to control operation of said second valve means in response to changes in the liquid level in said separator means.

4. A system in accordance with claim 3 in which the first and second valve means are solenoid valves.

5. A system in accordance with claim 1 in which said means for generating and transmitting said first and second signals comprise:

a. a capacitance probe;
   b. computer means connected to said probe; and
   c. meter means connected to said probe and to said computer means.

6. A system in accordance with claim 1 in which said means for generating and transmitting said first and second signals comprise:
   a. densitometer means;
   b. computer means connected to said densitometer means; and
   c. meter means connected to said densitometer means and said computer means.

7. A system in accordance with claim 5 in which the meter means is a positive displacement meter.

8. A system in accordance with claim 5 in which the meter means is a turbine meter.

9. A system in accordance with claim 6 in which the meter means is a positive displacement meter.

10. A system in accordance with claim 6 in which the meter means is a turbine meter.

11. A system in accordance with claim 1 in which the supply of said mixture is at least one well fluidly connected with an oil producing subterranean formation.

12. A system in accordance with claim 1 in which: the number of said separator means comprises between two and fifteen.

13. A system in accordance with claim 12 in which:
   1. one of said separator means is connected to at least one well penetrating a producing subterranean formation forming said supply of said mixture; and
   2. in which the other of said separator means are each connected to a plurality of wells penetrating one or more producing subterranean formations and forming a supply of said mixture for said other separator means.

14. A system in accordance with claim 1 in which the injection means comprise:
   1. at least one pump means for pumping said demulsifying agent into said separator means, and
   2. at least one valve means connected to said signal generating and transmission means.

15. A system in accordance with claim 14 in which the valve means comprises a solenoid valve.

16. A system for treating a liquid mixture containing an oil and water emulsion and connectable to at least one vessel which functions to separate the emulsion from the liquid mixture and discharge the separated emulsion from the vessel into emulsion discharge means comprising:
   a. means connected to the emulsion discharge means for generating and transmitting signals proportional to either amount of water in said emulsion discharged from said vessel or the total amount of emulsion discharged from said vessel when the percentage of water in said emulsion discharged from said vessel exceeds a predetermined percent and;
   b. an injector connected to said vessel and to said means for generating and transmitting signals and operable in response to said signals to inject a selected amount of demulsifying agent into said mixture in said vessel when the percentage of water in said emulsion discharged from said vessel is above said predetermined percent, said injector including:

a pump having an outlet connected to said vessel and an inlet;

valve means connected to said pump and to said means for generating and transmitting signals and controlling operation of said pump in response to said signals; and c. a source of demulsifying agent for use in treating said oil and water emulsion and connected to said pump, said pump being capable of pumping said demulsifying agent from the source of said demulsifying agent into said vessel.

17. A system as described in claim 16 including at least one valve in said pump outlet responsive to other signals indicative of discharge of emulsion from said separator vessel.

* * * * *